July 15, 1952  P. H. THOMAS  2,603,136
ROTARY HOE

Filed Nov. 8, 1943  5 Sheets-Sheet 1

Inventor:
Percy Harold Thomas
by his Attorneys
Howson & Howson

July 15, 1952 P. H. THOMAS 2,603,136
ROTARY HOE
Filed Nov. 8, 1948 5 Sheets-Sheet 3

Inventor:
Percy Harold Thomas
by his Attorneys
Howson & Howson

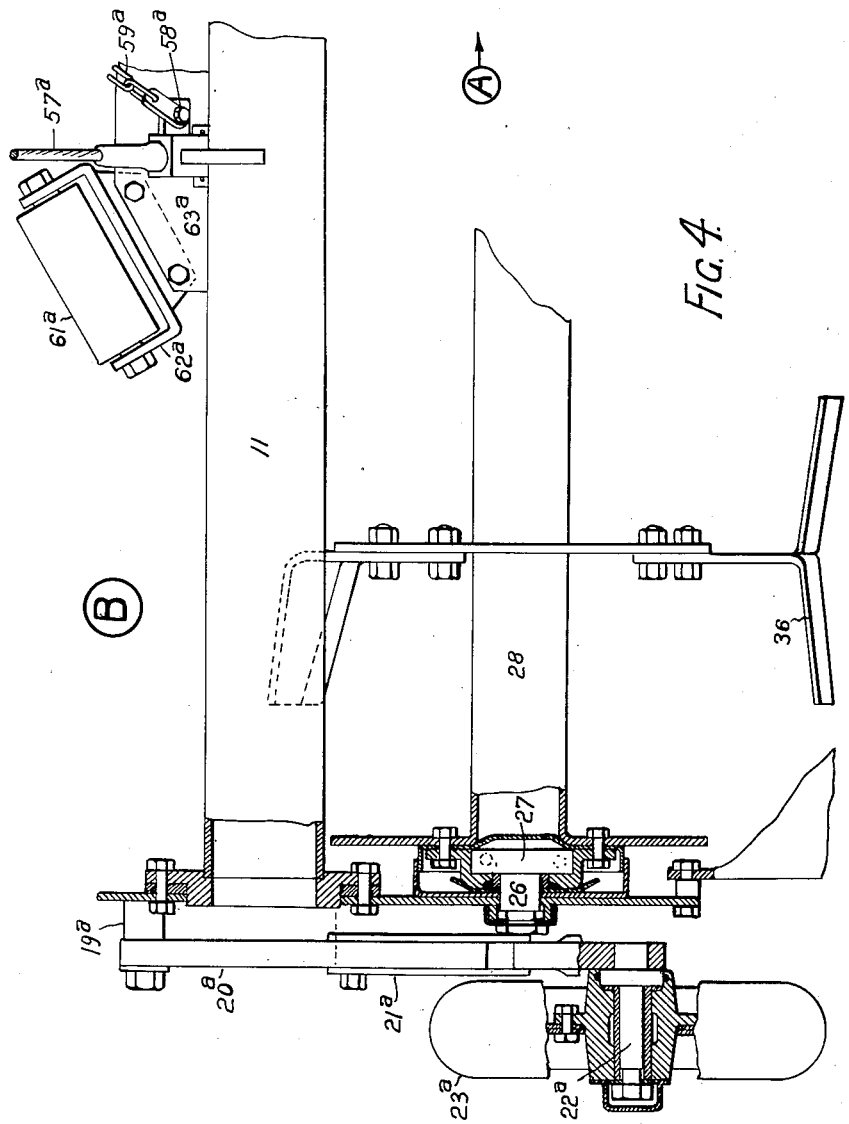

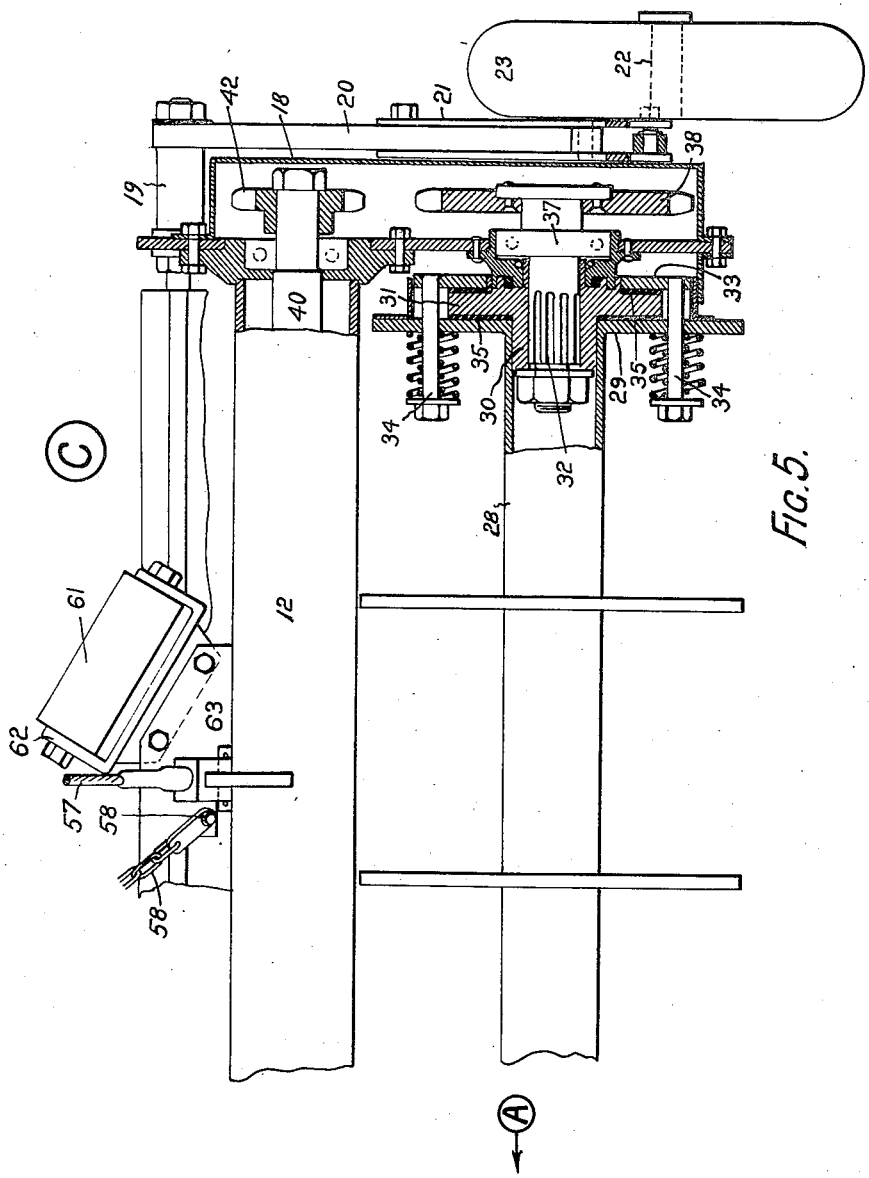

Patented July 15, 1952

2,603,136

UNITED STATES PATENT OFFICE 2,603,136

ROTARY HOE

Percy Harold Thomas, Beecroft, near Sydney, New South Wales, Australia, assignor to Howard Auto-Cultivators Limited, Northmead, New South Wales, Australia, a corporation of New South Wales, Australia Application November 8, 1948, Serial No. 58,859
In Australia November 25, 1947

2 Claims. (Cl. 97—40)

This invention has been devised to provide a rotary hoe of the type adapted to be trailed behind a tractor or other power vehicle (called herein a trailer hoe) and to be actuated by a power take-off from the vehicle.

A feature of the invention is that the weight of the trailer hoe is substantially borne by land wheels, and that forces created by the hoe in operation will not produce appreciable uplift or downpull of the tractor.

A further feature of the invention is that the hoe will follow the contour of the ground irrespective of the position of the tractor within practical limits.

Basically the invention consists in the construction of a trailer hoe having a tubular main frame positioned transversely, housing a driven shaft, and affixed centrally to a box assembly housing a gear and shaft connection to a telescopic power transmission shaft connected thereto, which transmission shaft is connected to a power take-off on the tractor by means of universal couplings. The box assembly also has a draw-bar structure connected to the tractor by means of a universal coupling.

The tubular main frame has side frames affixed thereto, and each side frame has an arm pivoted thereto adjacent the forward end thereof. These arms project rearwardly and downwardly, and at the rear end thereof have land wheels mounted thereon. Means are provided to hold the arms at determined angular positions. The side frames also have mountings thereon for the hoe rotor shaft arranged so that the axis of the hoe rotor shaft is maintained as near as practicable to the axis of the land wheels in a vertical plane when in their various settings. One side frame has a chain case and chains therein connecting the driven shaft to the hoe rotor shaft. Gears may be substituted for the chains. Means are combined with the aforesaid structure to lift the trailer hoe during adjustment and transport.

Figure 1:
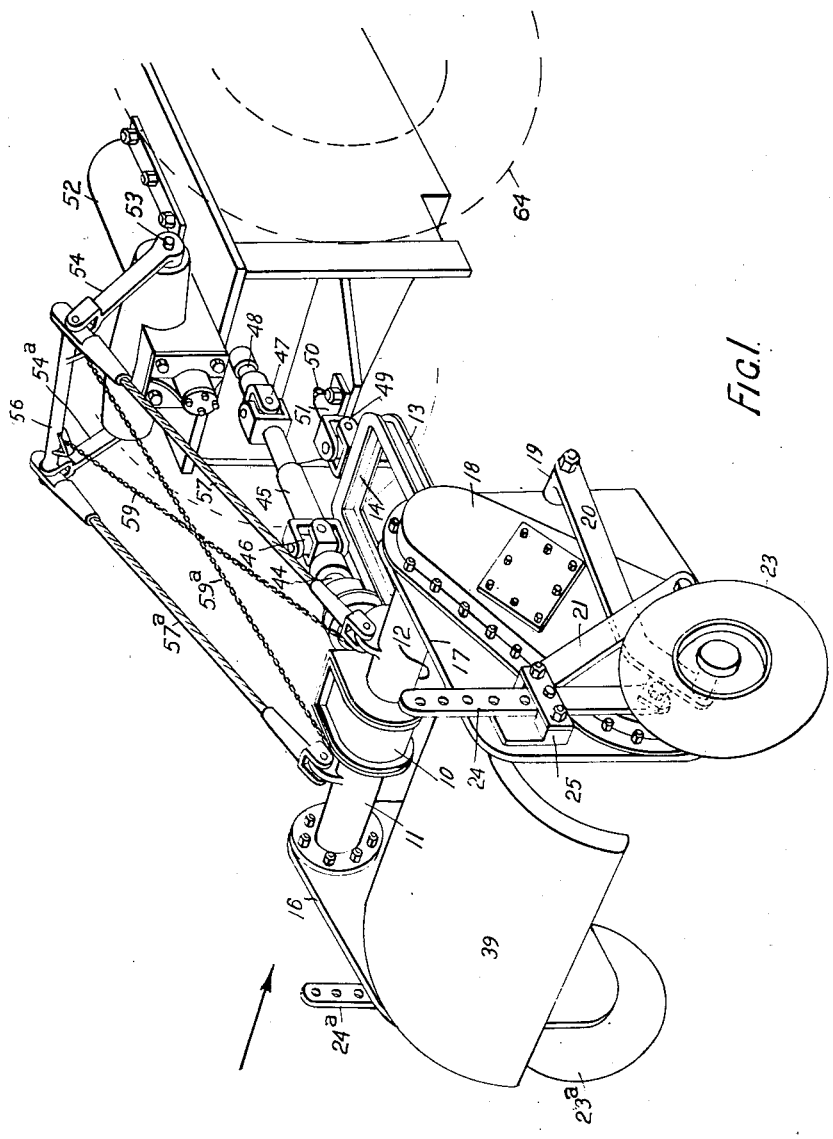
Figure 2:
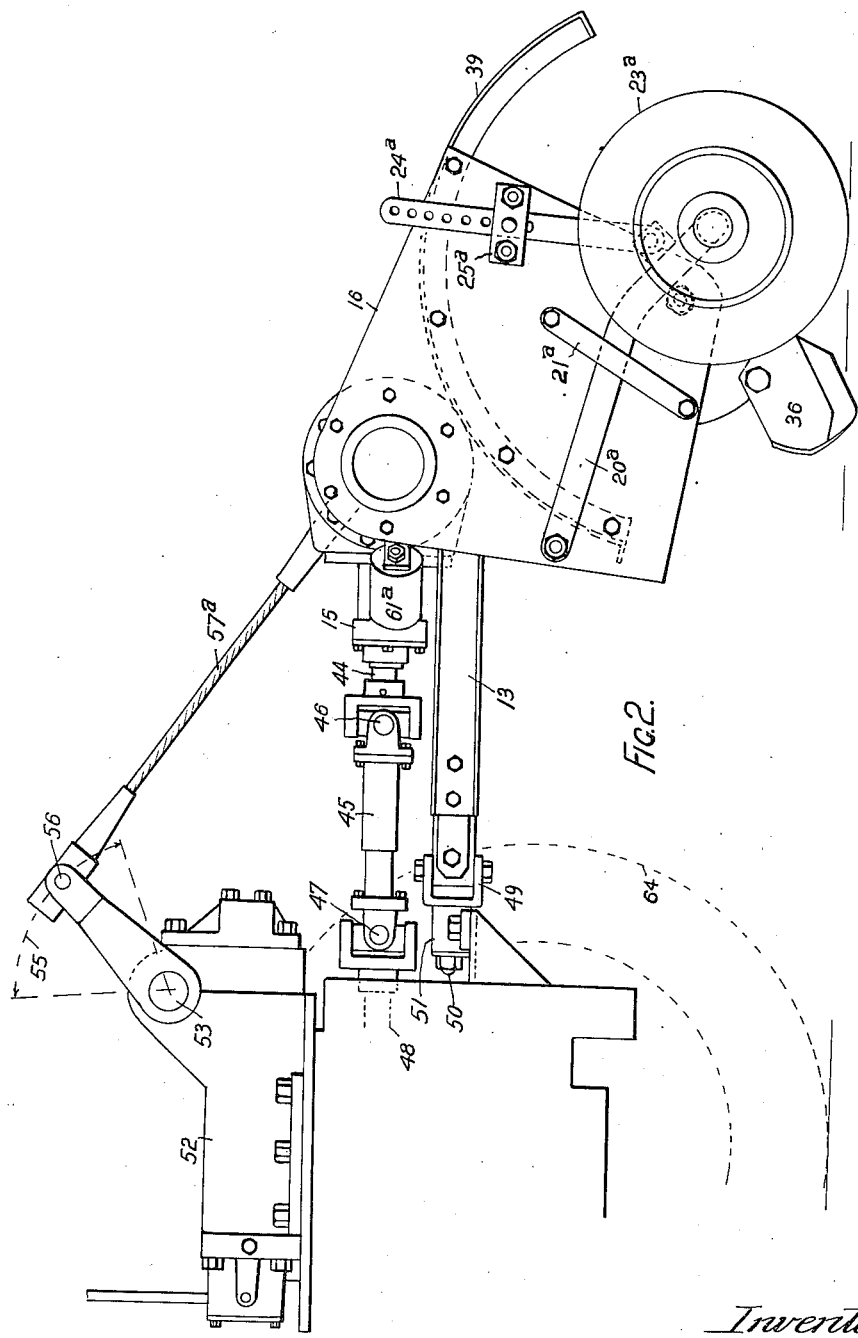
Figure 3:
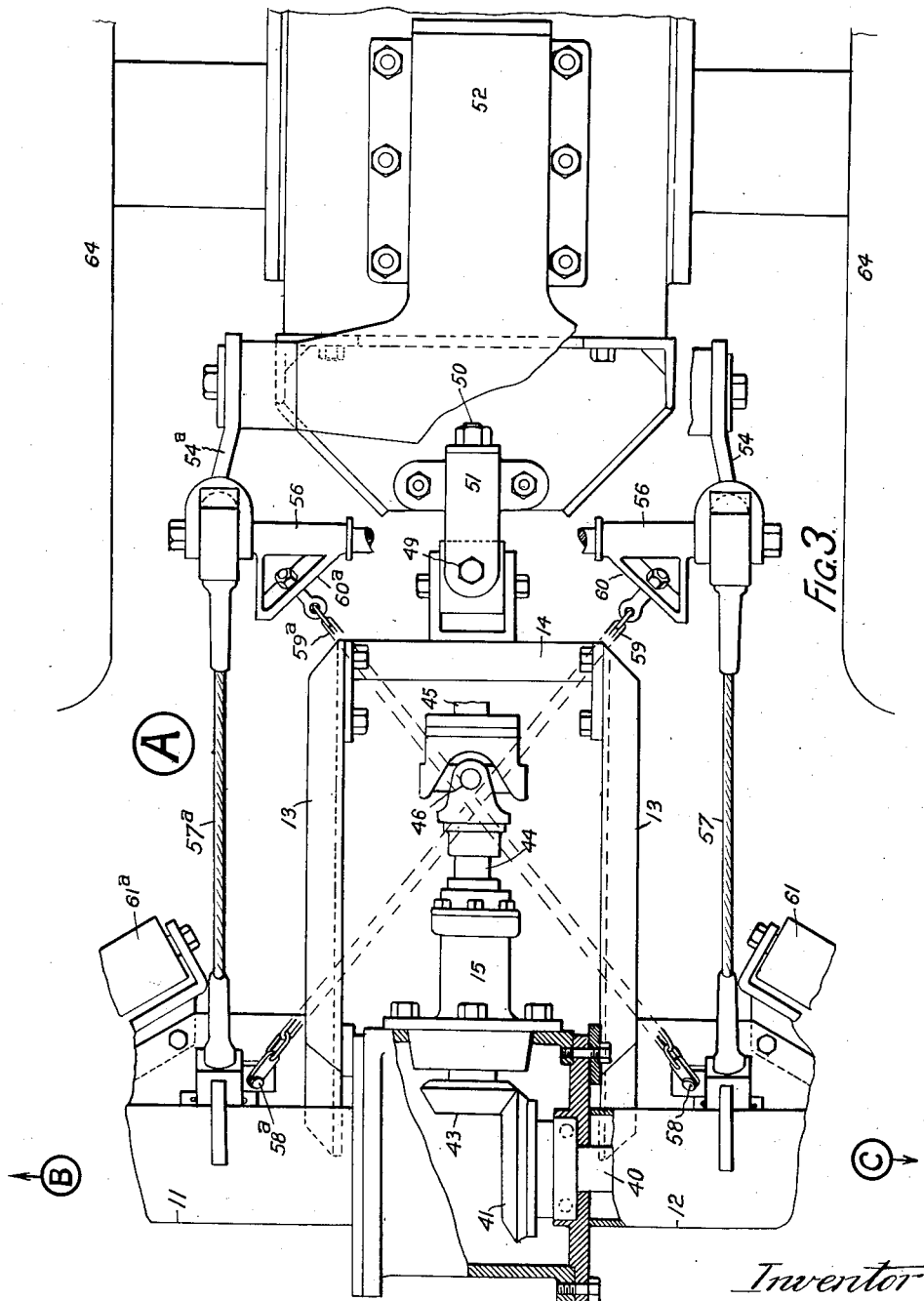

The particular construction and arrangement of the aforesaid parts and other features of the invention are shown in detail in the annexed drawings, wherein Fig. 1 is a perspective view of the complete trailer hoe in operative position; Fig. 2 is a side elevation in the direction of the arrow in Fig. 1; Figs. 3 and 4 and 5 are arranged in three parts A, B, C, respectively and together form an enlarged plan partly in section.

For the purpose of this description, the trailer hoe is built up from a box assembly 10, to the sides of which laterally extending, tubular frame members 11 and 12 are affixed. A draw-bar frame consisting of side members 13 and front member 14, is affixed by said side members to the bottom of the box assembly 10 and projects forwardly therefrom. Above the draw-bar frame, a pinion shaft housing 15 is affixed to the box assembly 10.

Side frames 16 and 17 are affixed to the tubular frame members 11 and 12 respectively. Side frame 17 has a chain case 18 mounted on the outer face thereof. At or near the front ends of the side frames 16—17, there are outwardly projecting pivot bearings 19—19a on which are mounted lever arms 20—20a. These lever arms project rearwardly and pass through guide brackets 21—21a and the ends of said lever arms are bent downwardly. Axles 22—22a are affixed to the ends of said lever arms and have land wheels 23—23a mounted thereon. Land wheel height adjusting and weight supporting rods 24—24a are pivoted to lugs on the lever arms 20—20a. Said lever arms project upwardly and pass through keep brackets 25—25a. Holes in these rods 24—24a and in the brackets 25—25a are adapted for the reception of suitable locking pins. The arrangement of these lever arms is such that the land wheels 23—23a can be moved through an arcuate path for the purpose of setting the depth of the rotor. The object of this construction is to maintain the axis of the land wheels 23—23a at all positions as near as practicable to the axis of the rotor shaft in a vertical plane so that the rotor will follow the contour of the land traversed by the land wheels at the depth at which said wheels are set. Elevator means which facilitate the setting of the land wheels will be described later in this specification.

Side frame 16 has a stub axle 26 affixed thereto, as best shown in Fig. 4, and this stub axle carries a bearing 27 on which one end of a tubular rotor shaft 28 is mounted. The other end of the rotor shaft 28 has a flange 29 thereon, and there is a bearing sleeve 30 within the end of said rotor shaft with a flange 31 thereon which is complementary to the flange 29. A stub axle 32 is splined and bolted in the bearing sleeve 30, and said bearing sleeve is held in position by clamp ring 33 and spring loaded studs 34. There are friction linings 35 between the flanges 29 and 31 and clamp ring 33. This arrangement constitutes a safety clutch. The rotor shaft 28 has blades mounted thereon which are indicated at 36, which blades are of conventional construction.

The stub axle 32 passes through a bearing 37 in the side frame 17 and projects into the chain case 18. There is a sprocket wheel 38 on the stub axle 26, which sprocket wheel is located within the chain case 18.

A shield 39 covers the hoe rotor and is built on conventional lines. This shield 39 is affixed to the side frames 16—17 and assists in the support of the complete mechanism as a structural unit.

A driven shaft 40 within the tubular frame member 12 has a bevel gear 41 thereon located within the box assembly 19, and there is a sprocket wheel 42 within the chain case 18. There is a chain drive as shown in dotted lines in Fig. 5, from this sprocket wheel 42 to the sprocket wheel 38 on the stub axle 32.

A bevel gear 43 meshes with bevel gear 41, and is keyed to a shaft 44 rotatably mounted in bearings in the housing 15. A telescopic cardan shaft 45 is connected by a universal coupling 46 to the pinion shaft 44, and by universal coupling 47 to a tractor power take-off shaft indicated at 48.

The front member 14 of the draw-bar frame has a universal coupling 49, and a draw-bar 50 affixed to this coupling is rotatably mounted in a draw block 51 affixed to the tractor.

Means are provided on the tractor to elevate the trailer hoe for the purpose of transport and for adjusting the depth setting of the hoe as described above. In the embodiment illustrated, these means consist of a hydraulic plunger rod in pivotal contact with a plunger in cylinder 52. The plunger rod is connected to a crank arm on cross shaft 53. This cross shaft 53 has a pair of crank arms 54—54a thereon. The travel of the crank arms is limited by the construction of the parts to the arc indicated at 55 in Fig. 2. The crank arms 54—54a are connected at their free ends by stay rod 56, and cables 57 and 57A extend between the ends of said stay rod 56 and suitable lugs on tubular frame members 11—12. In addition, a pair of chains 59—59a are anchored to said lugs on tubular frame members 11—12 by bolts 58—58a, then cross diagonally, and have their other ends anchored to brackets 60—60a on the stay rod 56.

Roller buffers 61—61a are mounted in brackets 62—62a on lugs 63—63a affixed to the tubular frame members 11—12. These roller buffers are positioned to abut the tractor wheels, indicated at 64 when extremities of right and left trailing are reached.

As constructed, the trailing hoe can swing or trail to the right and left, can rise and fall about the universal coupling 49, and it can roll and cant about the draw-bar 50. All these movements are permitted in the power drive by reason of universal couplings 46—47 and the telescopic cardan shaft 45.

The trailing hoe is elevated for transport by the hydraulic gear and the cables 57—57a. In the event that the hoe is trailing to the right or left when the elevating movement commences, the corresponding chain 59 or 59a will first pull the hoe to central position whereupon both cables 57—57a will tighten and thereafter effect the lift of the hoe to its elevated position. The chains 59—59a are then just slack enough to allow a small amount of side movement of the hoe during transport but leave the main weight of the hoe supported by the cables 57—57a. The arrangement of the cables and chains is such that when the hoe is lowered to operating position, both are sufficiently slack to permit limited side movement of the hoe.

I claim:

1. A trailer hoe construction comprising, in combination, a tubular main frame in two axially-aligned and spaced parts positioned transversely of the trailer hoe, a box assembly between said aligned and spaced parts and secured thereto, a driven shaft axially aligned within one of said parts and having its inner end within said box assembly, a gear on said inner end of said driven shaft, a drive shaft having one end extending into said box assembly, a gear on said one end of said drive shaft and meshing with said gear on said driven shaft, a telescopic power transmission shaft having one end connected to the other end of said drive shaft by means of a universal coupling, a power takeoff on a tractor connected to the other end of said power transmission shaft by means of a universal coupling, a draw-bar structure on said trailer hoe connected to the tractor by means of a universal coupling, side frames affixed to the outer ends of the tubular main frame parts and projecting rearwardly therefrom, said side frames each having an arm pivoted thereto at the forward end thereof, said arms projecting rearwardly and downwardly and having land wheels mounted on their rear ends, means to hold said arms at determined positions, mountings on said side frames, a hoe rotor shaft with blades thereon arranged in said mountings so that the axis of said hoe rotor shaft is maintained relatively close to the axis of the land wheels in a vertical plane in the various settings of the land wheels, one said side frame having a chain case thereon, and a chain in said case connecting the driven shaft to the hoe rotor shaft, and means to elevate the trailer hoe during adjustment and transport thereof.

2. A trailer hoe as defined in claim 1 wherein the draw-bar structure includes longitudinally-extending side frame members having one end of each member connected to the said box assembly at opposite sides thereof, and their other ends connected to the tractor by means of said universal coupling between said draw-bar structure and said tractor.

PERCY HAROLD THOMAS.

REFERENCES CITED

The following references are of record in the file of this patent:

UNITED STATES PATENTS

| Number | Name | Date |
| --- | --- | --- |
| 580,402 | Johnson | Apr. 13, 1897 |
| 919,039 | Leoni | Apr. 20, 1909 |
| 1,262,286 | Thomas | Apr. 9, 1918 |
| 1,830,565 | Schaeffers | Nov. 3, 1931 |
| 1,843,119 | Bussman | Feb. 2, 1932 |
| 2,032,467 | Burke | Mar. 3, 1936 |
| 2,051,694 | Fishleigh | Aug. 18, 1936 |